United States Patent
Bartolini et al.

(10) Patent No.: US 7,570,195 B2
(45) Date of Patent: Aug. 4, 2009

(54) HIGH-CAPACITY LOCATION AND IDENTIFICATION SYSTEM FOR COOPERATING MOBILES WITH FREQUENCY AGILE AND TIME DIVISION TRANSPONDER DEVICE ON BOARD

(75) Inventors: Simone Bartolini, Rome (IT); Gaspare Galati, Rome (IT)

(73) Assignee: Univeristà Degli Studi Di Roma "TOR VERGATA", Rome (IT)

( * ) Notice: Subject to any disclaimer, the term of this patent is extended or adjusted under 35 U.S.C. 154(b) by 0 days.

(21) Appl. No.: 11/665,256

(22) PCT Filed: Oct. 11, 2005

(86) PCT No.: PCT/IB2005/053343

§ 371 (c)(1),
(2), (4) Date: Jun. 6, 2007

(87) PCT Pub. No.: WO2006/040730

PCT Pub. Date: Apr. 20, 2006

(65) Prior Publication Data

US 2008/0106457 A1    May 8, 2008

(30) Foreign Application Priority Data

Oct. 14, 2004   (IT)   .......................... RM2004A0503

(51) Int. Cl.
*G01S 13/78* (2006.01)
(52) U.S. Cl. .......................................... 342/37; 342/40
(58) Field of Classification Search ................... 342/36, 342/37, 40; 701/120
See application file for complete search history.

(56) References Cited

U.S. PATENT DOCUMENTS

| 5,341,139 | A | | 8/1994 | Billaud et al. |
| 5,355,513 | A | * | 10/1994 | Clarke et al. ................... 455/20 |
| 5,400,031 | A | | 3/1995 | Fitts et al. |

(Continued)

FOREIGN PATENT DOCUMENTS

EP              0 435 607           7/1991

(Continued)

OTHER PUBLICATIONS

International Search Report for PCT/IB2005/053343 mailed Jun. 12, 2006.

(Continued)

*Primary Examiner*—Dan Pihulic
(74) *Attorney, Agent, or Firm*—Nixon & Vanderhye, PC

(57) ABSTRACT

Cooperating mobiles (ground vehicles, aircraft) are located and identified by Multilateration and Automatic Dependent Surveillance-Broadcast (ADS-B) techniques using the frequency band and the format of the Secondary Surveillance Radar (SSR) signals in high traffic situations. Standard messages, transmitted by the mobile on the downlink channel, i.e. to a set of fixed receiving stations, and including the identification code, permit the location of the mobile by multiple time measurements (Multilateration) from a subset of the set of fixed receiving stations; when the message contains the position (GPS and, later, Galileo datum) the mobile may be located with the ADS-B when in view even of a few stations or of a single station. In order to overcome the problem that arises with high traffic, i.e. the superimposition of signals, called garbling.

25 Claims, 4 Drawing Sheets

U.S. PATENT DOCUMENTS

| | | |
|---|---|---|
| 6,792,058 B1 | 9/2004 | Hershey et al. |
| 2002/0130814 A1 | 9/2002 | Smith et al. |
| 2003/0176198 A1 | 9/2003 | Chisholm |
| 2004/0174295 A1 | 9/2004 | Stayton et al. |
| 2008/0106457 A1* | 5/2008 | Bartolini et al. ............... 342/40 |

FOREIGN PATENT DOCUMENTS

| | | |
|---|---|---|
| EP | 1807713 A2 * | 7/2007 |
| WO | 2004/023426 | 3/2004 |
| WO | WO 2006040730 A2 * | 4/2006 |

OTHER PUBLICATIONS

Nilsson, "Time Augmented GPS/DGPS in Sweden," IEE/IEEE Vehicle Navigation and Information Systems, 1993, pp. 718-731, XP002363716.

Cordesses, "Direct Digital Synthesis: a tool for a periodic wave generation (Part 1)," IEEE Signal Processing Magazine, Jul. 2004, pp. 50-54, XP002380166.

* cited by examiner

HIGH-CAPACITY LOCATION AND IDENTIFICATION SYSTEM FOR COOPERATING MOBILES WITH FREQUENCY AGILE AND TIME DIVISION TRANSPONDER DEVICE ON BOARD

This application is the U.S. national phase of International Application No. PCT/IB2005/053343 filed 11 Oct. 2005, which designated the U.S. and claims priority to IT RM2004A000503 filed 14 Oct. 2004, the entire contents of each of which are hereby incorporated by reference.

FIELD OF THE INVENTION

This invention allows cooperating mobiles (ground vehicles, aircraft) to be located and identified by Multilateration and Automatic Dependent Surveillance-Broadcast (ADS-B) techniques using the frequency bands and the standard messages of the Secondary Surveillance Radar (SSR) and in particular of the SSR Mode S (Mode Selective) in high traffic situations. Standard messages, transmitted by the mobile on the downlink channel, i.e. to a set of fixed receiving stations, and including the identification code, permit the location of the mobile by multiple time measurements (Multilateration) from a number of those receiving stations; when the message contains the position (GPS datum, and, in the future, the more accurate and reliable Galileo datum) the mobile may be located when in view of a few stations or even of a single station. Cooperative location of the mobile is performed by means of the standard SSR transponder on board of airplanes (SSR transponder complying with air-worthiness requirements) or by means of the similar transponder device on board of equipped ground vehicles (due to the lack of air-worthiness requirements it is often called non-transponder device, or for short, NTD). The applications of location and identification functions for aircraft and ground vehicles include (i) the control and management of airport traffic on runways and taxiways (ii) the control of traffic, and operations, on the Apron (iii) the control of approaching and departing aircraft nearby the airport and in the Terminal Manoeuvring Area. The invention may also be applied in the Vessel Traffic System.

The aim of this invention is to increase the capacity of the SSR Mode S downlink channel and, thereby, the number of mobiles that may be identified, located and tracked in the same operating zone, e.g. in a large airport. This downlink channel has a nominal central frequency of 1090 MHz, and the relevant messages are of two kinds, i.e. either a reply (response from the transponder to SSR ground station interrogation or to collision avoidance system interrogation) or a squitter (spontaneous emission of the transponder with nominal mean typical rate of one per second); in the following they will be called SSR signals or simply signals.

The present invention is based on the generation, transmission and reception of the signals sent from the SSR transponder or from the NTD (in the following, for the sake of simplicity the term transponder or transponder device will designate both of them).

Finally, the present invention is applicable also to a particular transponder—installed in a fixed point—used in the Multilateration systems (these systems are treated in the following) having the basic transmission capacity for spontaneous SSR replies, or squitter, and usually called "squitter generation unit" (SGU).

The SSR radar system—both traditional or Mode A/C and selective or Mode S—is described in some documents, for example in the classic book: [1] M. Stevens *"Secondary Surveillance Radar"*, Artech House, 1988.

SSR system and in particular the transponder and its signals and messages are the subject of international regulations and standards issued by the International Civil Aviation Organization, ICAO, and contained in the well known Annex 10 to the Convention on International Civil Aviation, available in ICAO's head office in Montreal or to be required to ICAO, whose Website is: www.icao.int.

The present invention, as shown in his detailed description, is based on a new way to generate SSR—like signals—emitted by the NTD, by the SGU, by the fixed transmission stations to the transponder devices or by the airborne SSR Mode S transponder; the new features are:

(a) a variable carrier frequency;
(b) a time division scheme for the transmission.

In this way, the SSR-based location system becomes suitable to the discrimination of overlapped signals; this is obtained by frequency analysis and, in the cases of high traffic in the downlink channel, by super resolution techniques. The overlapping situations are, in principle, avoided by the time division multiple access, at the expense of a more complicated transponder and of additional system management functions.

The super resolution algorithm for a frequency discrimination of the SSR signals is useful and often necessary when the system works in a high traffic density environment for the SSR transponder channel, whose nominal carrier frequency is 1090 MHz, and the carrier frequency selection increases the discrimination between the signals sent by the transponder, whose tolerance of the central frequency is lower and lower, thus making hard to rely on it. However, using different central frequencies for the SSR signals (in the band permitted by ICAO ) it is possible to increase the SSR channel capacity in the transmission from a transponder to the SSR ground station by filtering techniques or by super resolution techniques.

The great number of applications, resulting from Mode S signals utilization, will require to operate in an environment with a transmission rate of tens or hundreds of thousands signals for second. As explained before, amongst the applications in the development or in the preoperational phase there is the Automatic Dependent Surveillance-Broadcast (ADS-B) mainly used for the air traffic control and the Multilateration/Wide Area Multilateration (the latter is often designated as WAM) mainly used for the control of the airport surface and/or for the control of the Terminal Manoeuvring Area and of the approach.

The system for control and management of the airport surface traffic is internationally known as A-SMGCS (Advanced-Surface Movement Guidance and Control Systems). This system is described inter alia in the document: [2] Eurocae ED-8; *"Minimum performance specifications for Advanced-Surface Movement Guidance and Control Systems"*, January 2001, available from Eurocae, 17, rue Hamelin, Paris Cedex 16.

Concerning the surveillance/identification system known as Multilateration (MLAT), that is one of the A-SMGCS surveillance elements, to which—in significant way but not exclusively—the present invention is aimed from the operational point of view, the functional and operational requirements are illustrated in the following document issued by Eurocae—The European Organization for Civil Aviation Equipment: [3] Eurocae ED-117 *"Minimum operational performance specifications for Mode S multilateration systems*

*for use in A-SMGCS*", April 2003, available from Eurocae, 17, rue Hamelin, Paris Cedex 16, tel. +33 1 45 71 88, E-mail eurocae@eurocae.com.

An advanced MLAT system is the subject of a recent patent application: [4] Patent application N. RM 2004 A 000249—dated 17.05.2004—entitled "Sistema di sorveglianza ad alta precisione mediante multilaterazione dei segnali SSR" with assignee Tor Vergata University, Rome.

The time Division Multiple Access applied to moving vehicles and aircraft is described in: [5] J. Nilsson "*Time Augmented GPS/DGPS in Sweden*", IEE/IEEE Vehicle Navigation and Information Systems, Ottawa,—VNIS '93, pp. 718-731, ©1993 IEEE State of the Art As explained in the previous section of this description, many user devices (i.e. airborne transponders, "non transponder" devices and SGU devices) use the SSR downlink channel with the same nominal carrier frequency of 1090 MHz; this makes it possible unwanted overlapping of two or more signals in correspondence of the station receiving the SSR signals (i.e. the Multilateration or the ADS-B system ground station or even the classical SSR sensor). Therefore, the increased traffic in the SSR channel produces situations in which the errors-free signal information extraction (that is the decoding of replies or squitter) has a probability that decreases if the mean number of received signals per seconds by the station does increase. This probability may be exceedingly low. The present conventional techniques for decoding SSR overlapped signals—i.e. for degarbling them—are based on a time domain analysis of the received signal, as known by the experienced people working in this area, and are more effective in the case of some (e.g. two) receiving channels obtained by means of an equal number of antennas or of antenna patterns (like in the significant case of Monopulse SSR receiving stations, as described, inter alia, in the above-referenced book: M. Stevens "*Secondary Surveillance Radar*", Artech House, 1988.).

Anyway, it has been found by experience that conventional degarbling techniques permit a correct decoding with a good probability for the leading reply of two superimposed replies only for a moderate degree of superimposition; their effectiveness is particularly limited in the Multilateration systems whose receiving stations, for cost reasons, are not equipped with many receiving channels nor use the monopulse technique.

In order to allow the SSR signals decoding also for a high degree of superimposition a non conventional analysis has been studied that includes also the frequency domain and is described in:

[6] Patent application RM 2001 A 00176—dated 3 Apr. 2001—"Apparato ricevente ed elaborative per segnali "replica" del radar secondario di sorveglianza con capacitá di super risoluzione" assignee: Tor Vergata University of Rome. The mathematical background is explained, inter alia, in the book: [7] P. Stoica, R. L. Moses "*Introduction to spectral analysis*", Prentice Hall, Upper Saddle River, N.J. 07458, USA, 1997).

The above-referenced invention is a receiving and processing system for reply/squitter of secondary surveillance radar (Mode S, Mode A/C) that exploits a frequency domain analysis of these signals to degarble them, i.e. to solve the signals superimposing problem. In particular this system uses spectral super resolution methods for an accurate analysis of the received signals carrier frequency. By means of a frequency analysis and of special timing techniques, it is possible to decode the signals information in most of the cases in which a signal is affected by interference with other signals. It has to be noticed that this invention is based on the hypothesis that every signal spectrum has a central (or carrier) frequency that can be—although not very much—different from other signals. In fact, the ICAO standards (as in the already mentioned ICAO document "Annex 10 to the Convention on International Civil Aviation" ) set a carrier frequency tolerance of the SSR transponder emitted whose central value has to be between 1089 and 1091 MHz. Therefore, the carrier frequencies of two superimposed signals are different with a given probability, making it possible the above-referenced patented method or even other perhaps simpler (and less effective) frequency estimation methods.

However, as technology improves, the replies and squitter carrier frequencies emitted by modern transponders are generated by local oscillators with a higher and higher precision and stability, better and better than the minima values from ICAO standards. This is mainly due to the advancements of technology for affordable, precise and stable oscillators and for their control circuitry. The enhanced precision implies the reception, in the ground station, of signals with carrier frequency much closer to the nominal frequency of 1090 MHz and, therefore, very close to each other. As a consequence, there is a continuing reduction of discrimination capability by these super resolution algorithms based on spectrum analysis. Moreover, these algorithms are effective when there is at least a part of the leading signal free from superimposition, i.e. are not suited to complete—or nearly complete—overlapping situations.

Summing up, the state of the art limits in the context of the present invention are related to the difficulty in the decoding of SSR signals (in particular, Mode S reply/squitter) when they are totally or partly superimposed, situation that will become more and more probable in view of the future increase of the number of operational transponders in the most developed areas of the world (for example in the major airports or in their surroundings). The previously mentioned patent [6] permits to overcome the limits with a frequency analysis, but this analysis will be, in the near future, less and less effective due to the increase of the quality and performance of commercial transponders in terms of stability and precision of the emitted central frequency with respect to the ICAO nominal frequency of 1090 MHz.

Furthermore, the transponder capacity as a communication and surveillance element with transmission to a receiving station (known as downlink transmission) of the relevant data of airplanes or vehicles is limited by the use of only one nominal carrier frequency, i.e. the 1090 MHz as defined by the ICAO regulations, in contrast with a receiver frequency band which, due to the transponder transmission carrier frequency tolerances, is much greater (as much as 3 to 5 times) than the frequency band associated to the information contents of the SSR signal. By a proper work on the SSR signal generation and on the SSR signal receiver, that is an element of the SSR receiving station, it is possible to create more receiving channels. It results an increase of the system capacity, needed to cope with the continuous increase of the SSR downlink channel used both in the air traffic and in the airport traffic. In particular, present-day techniques fail to permit simultaneous identification and location of all service vehicles (such as those needed for handling operations, maintenance, survey of runways and taxiways, fire brigade, police etc.) operating in a big airport, whose number may be as large as a thousand. As a matter of fact, state-of-the art techniques—based on radio modem or wireless LAN—do not permit the transmission of the relevant quantity of data needed for complete airport surveillance with the required data rate (one update per second), nor they satisfy the required values for integrity, continuity and availability; moreover, they do not guarantee not to exceed a maximum value for the latency time of the surveillance information, which is of course a safety-critical item.

A basic limitation of the state of the art is the random transmission time of squitter by ground vehicles and aircraft. A squitter is a spontaneous emission of a Mode S signal from a transponder, normally every second plus a random interval uniformly distributed between −0.2 and +0.2 seconds that is needed to reduce the chance of repeated superimposition of signals. This kind of asynchronous and randomised operation is in contrast with the need to control the downlink Mode S channel, that is well performed with the classical Mode S interrogation-reply mechanism. In the present invention this limitation is avoided by a synchronization of the emissions of squitter from many nearby transponders using a common time reference, as explained in the following.

Finally, in the present state of the art the transponder devices on board of ground vehicles can only transmit squitter: they have no reception capability. Conversely, the present invention provides a transmission channel to the transponder devices permitting the fixed transmitting stations to send them controls, commands, traffic data and other data. This channel has the same innovative features as the transmission channel from the transponder device to the fixed receiving stations or to other transponders.

The invention exploits the fact that a NTD for vehicular application has not to be compliant with air-worthiness requirements nor with the ICAO regulations, thereby permitting a significant degree of flexibility in its design and operation.

SUMMARY OF THE INVENTION

The present invention overcomes, with innovative approaches, the limitations prior to the invention itself as described in the previous paragraphs. It permits a noticeable improvement of the operation of the SSR-based systems (including the MLAT, the WAM, and, most important, the NTD equipment and the related Advanced Vehicle Management System or AVMS for short) in terms of capacity and continuity of the service. In particular, the state of the art limitations previous of the present invention are overcome by a new signal generator in the transponder device, that can be defined "with frequency agility and time division" because (a) the central transmitted frequency is variable, within the already mentioned ICAO standards, in every new emission of the transponder within a number of disjoint bands, and (b) the transmission is allocated in time slots different from transponder to transponder in such a way that each SSR Mode S signal reaches any receiving station of the MLAT/WAM system in a time that is different enough from any other SSR Mode S signal to avoid any overlapping in time.

The time division technique, item (b), calls for a time reference common to all transponders that is supplied by the GPS time (and can be recovered even in the absence of the GPS signals), while with frequency agility, item (a), this invention adds to the information contained in the signal code emitted by the transponder (this code being defined in the Annex 10 and inter alia described in detail in [1]), a further information, i.e. the central frequency, that permits, with high probability, to decode superimpose signals using a frequency domain analysis, such as the super resolution techniques whose usage is patented according to [6].

Moreover, the SSR stations, or sensors, are enhanced, with the simple addition of a filter—analogue or digital—in the receiving section, by many receiving channels (e.g. 5 channels in the, say, 6 MHz wide band around 1090 MHz; these channels can be called $H_2, H_1, H_0, H_{-1}, H_{-2}$) with consequent increase of the data transmission capacity in the downlink channel from the transponder to the ground station, and of the surveillance and identification capacity. In this way the total SSR system capacity is increased, and in particular a much more reliable signal decoding is ensured in high density environments like in an airport for the identification and the localization of many airplanes and service vehicles (the overall number of transponders can be as high as a thousand).

Due to greater criticality of the identification and localization of airplanes for safety reasons, the N carrier frequencies, in the frequency limits of the ICAO standards, can be subdivided in two groups, in which one (of L carrier frequencies) being used by landing or departing airplanes, and one (of M carrier frequencies; N=L+M) allotted to the service vehicles moving on the airport, with possible definition of vehicular sub-groups by the user (e.g. a subgroup for vehicles to be confined within the Apron and another sub-group for vehicles allowed to enter the manoeuvring area); the selection is performed by the operator of the vehicle using the HMI or, depending on specific operational needs, by a system's CPMS (central processing/managing subsystem) thru the fixed-to-mobile (uplink) transmission channel . Just to better explain the principle of this invention, let us suppose that N=50, M=40 and that there are 10 carrier frequencies for each of the following channels $H_{-2}, H_{-1}, H_1, H_2$ while frequencies of today's very stable and precise aircraft transponders are "naturally" in the channel $H_0$ around 1090 MHz. In this way it will be unlikely the superimposition—with the same carrier frequency—of two (or more) signals coming from airplanes and vehicles moving on the airport surface, and there will never be superimposition, with the same frequency, of two signals coming one from an aircraft and the other from a service vehicle. To completely avoid the superimposition of signals from the many (e.g. one thousand) service vehicles in a big airport, their transponders are operating in time-division multiple access, i.e. the renewal time for the location and identification function, whose commonly used value is one second, is divided in a number of slots (for example, 3300 slots of 0.3 milliseconds each, including 0.12 ms for the duration of the extended squitter, 0.03 ms as a guard time and 0.15 ms as a travel time to reach the farthest receiving station—i.e. tens of km away—with a level above the minimum triggering level; in Wide Area applications, such as the control of approach or of the whole Terminal Manoeuvring Area, the travel time is about twice and the number of slots becomes 2200, anyway much greater than the expected number of aircraft to be controlled). A central processing/managing subsystem (CPMS) of the MLAT/AVMS system assigns a slot to each service vehicle, and its transponder emits a squitter every second at the beginning of its slot; however, replies are emitted in correspondence to interrogations without respecting the time slots, but the CPMS knows the approximate location of the transponder and the scheduled squitter times of all transponders and may manage interrogation times in such a way that the reply does not present garble with other replies or squitter. As the number of available slots exceeds the request for downlink transmission (i.e. from the mobiles to the fixed stations) some slots, possibly one for each vehicle, will be allocated to selective uplink transmission, i.e. the CPMS may transmit to each mobile equipped with a transponder device operating in the 1090 MHz band.

The relevant uplink data include (i) selective interrogations: the CPMS elicits a reply from a particular transponder to obtain identity and position, (ii) data and controls: the CPMS send data to the vehicle (e.g. indications of violation of a forbidden zone, alarms for nearby traffic, operational and control data) to be displayed thru the HMI and (iii), in the case of TDMA (Class 4 system, see after) timing recovery data, as described at the end of this paragraph. Moreover, other slot will be allocated to non-selective crosslink transmissions, in which the transponder, selecting a reduced sensitivity during the slot time, listen the 1090 MHz channel and receives extended squitter from nearby transponders, from which it reconstructs an image of the nearby traffic independently of the CPMS data.

The time slots are referred to the GPS (Galileo) time, as every vehicle has a GPS (Galileo) receiver on board from which the Position, Velocity and Time (PVT) data are obtained; the position is stored in a memory and transmitted via the Mode S downlink channel—according to the Extended Squitter format—to all receiving stations in view, according to the well known ADS-B (Automatic Dependent Surveillance-Broadcast) concept. Anyway, the location of the vehicle can be obtained in an independent manner by Multilateration if the vehicle is in view of four receiving stations, as it is very likely in a big airport equipped with as many as 15 or 20 MLAT stations. In this case, surveillance and identification do not rely on GPS (Galileo) and, in the case of unavailability of the satellite navigation service, the time slots for transmission are obtained by the clock of each transponder. The deviation of this clock from the system common reference time has a linear, a quadratic and a wideband noise-like component; the linear and quadratic component have to be corrected in order to maintain the correct slotted timing for all transponders. To this end, the CPMS analyses the Time-of-arrival from each transponder to one or more receiving stations, and using its knowledge of the position of the transponder estimates the deviation of the transmission time from this transponder w.r.t. the system reference time and transmits it to the transponder: the deviation is used by transponder to correct the deviation of its calculated transmission slots by a simple filtering and prediction process, such as the well known Kalman algorithm. In such a way, the significant, disturbing part of the timing error is cancelled by subtraction. In addition to this, when high accuracy for the correction is required, and there are four or more stations in view, the redundancy in the Multilateration non-linear set of equations is exploited, the unknowns being the three space coordinates of the transponder and the emission time of the squitter, that in turn is related to the deviation of the clock.

Summing up, this invention is a high-capacity location and identification system for cooperating mobiles that overcomes the limits of the present state-of-the-art by a frequency agile and time division transponder installed on vehicles to be monitored and controlled and by the related ground stations and the control/management centre. In this context the state-of-the-art is referred to as a Class 1 systems, with transponder capability of transmitting short and long downlink messages (i.e. ADS-B, also called GPS squitter), with limited capacity due to the limitations of present Mode S-1090 MHz communication channel or of alternative channels such as VHF/UHF radio modem or Wi Fi-Wi Max.

The present invention includes new systems—and their constituting elements—with higher performance levels that can be tailored to the operational and budget requirements, i.e. Classes 2, 3 and 4, each class having the capabilities of lower classes. A Class 2 system has frequency-agile transponders whose central frequency is allocated in a number of channels (e.g. five) and has receiving stations capable of separation of the channels by filtering, in order to limit the effects of signal superimposition in the 1090 MHz channel, specially as far as disturbance of vehicle-based transponder signals on airborne transponders signals is concerned. A Class 3 system has the additional capacity of separation of superimposed signals within the same channel by frequency-domain super resolution (the transponder being the same as Class 2). A Class 4 has a time-division multiple access of transponders and of ground stations to the 1090 MHz communication channel, based on GPS/Galileo time and on back-up clock recovery capability. To every class a further feature (that we call "plus") can be added in which a vehicle receives the position and identity data from nearby vehicles; in such a way a traffic situation display on the vehicle can be fed to help safety of ground airport traffic in low visibility conditions even in the case of lack of transmission from the fixed stations to the transponder devices. Therefore this invention has six Classes: 2, 2+, 3, 3+, 4, 4+. As lower classes are easily obtained by downgrading (elimination of features), Class 4+ is described in the following. Class 5 utilizes a different modulation technique than Mode S for the vehicle-dedicated channels, i.e., in the case of five channels, for $H_{-2}$, $H_{-1}$, $H_1$, $H_2$; this modulation, known as BOC (Binary Offset Carrier), or Alt BOC, permits a minimum disturbance on channel $H_0$ (as the BOC-modulated signals of the vehicle channels have a spectral null on the centre of $H_0$ channel), a more precise measurement of the Time-of arrival, a better resistance to multipath; apart from the modulation, Class 5 operation is the same as Class 4.

BRIEF DESCRIPTION OF THE DRAWINGS

The invention is now described in reference to its currently preferred implementation, for purposes of explanation, without limitations to the scope of the invention. The drawings annexed to the present description are the following.

DETAILED DESCRIPTION OF THE INVENTION

Figure 1:
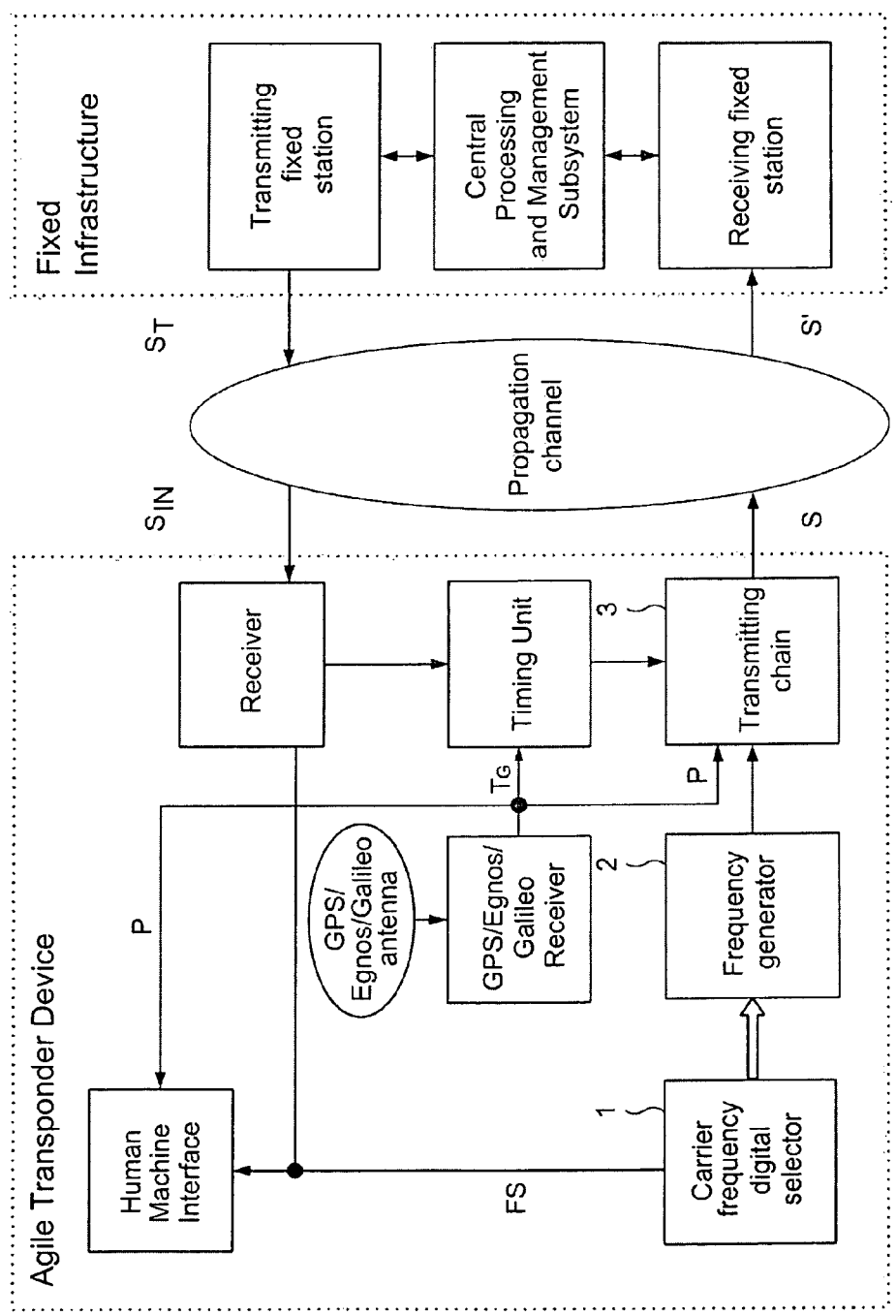
FIG. 1: General diagram of the high-capacity location and identification system for cooperating mobiles with frequency agile and time division transponder device, the present invention.

This invention is a system capable of locating and identifying a large number (e.g. thousands) of vehicles or aircraft, or any mix of vehicles and aircraft, being each vehicle or aircraft equipped with a suitable transponder. It is also capable of locating and identifying a large number (e.g. thousands) of vessels. This invention allows cooperating mobiles of civil traffic (ground vehicles, aircraft) to be located and identified by Multilateration (MLAT) and Automatic Dependent Surveillance-Broadcast (ADS-B) techniques using the Secondary Surveillance Radar (SSR) signals in high traffic situations, such as those of large airports. Standard messages, transmitted by the mobile on the downlink channel, i.e. to a set of fixed receiving stations, and including the identification code, permit the location of the mobile by multiple time measurements (Multilateration) from a number of the set of fixed receiving stations; when the message contains the position (GPS and, later, Galileo datum) the mobile may be located with the ADS-B when in view of a very few stations or even of a single station.

In order to overcome the problem that arises with high traffic, i.e. the superimposition of downlink signals, called garbling, the present invention uses (a) a variable carrier frequency in the downlink channel (b) a time division scheme for the transmission from different mobiles.

Thanks to the variable carrier frequency, the SSR-based location system becomes suitable to the discrimination of overlapped signal; this is obtained by frequency analysis and, in the cases of high traffic in the downlink channel, by super resolution techniques. Moreover, the downlink transmission capacity increases with respect to the present state of the art respecting the bandwidth limits as defined by the international regulations.

The more complex time division operation permits an allocation of time slots for transmissions (i) to the transponders i.e. uplink, (ii) from the transponders to the fixed stations i.e. downlink (iii) to/from transponders i.e. crosslink. The creation of a real-time image of all cooperating traffic is thereby made possible with display of the relevant traffic within the vehicles, by means of a suitable human-machine interface.

The variation both of the central frequency and of the emission time characterizing this invention for systems of Class 4 or superior adds to the system flexibility during its setting-up and its operation, as the surveillance and communication signals (uplink, downlink and cross link) may be allocated in a matrix whose rows are the frequencies and the columns are the time slots, thus permitting a very large number of messages to be transmitted without interference, and to tailor the system to the complexity its operating environment. The use of both time and frequency division multiple access is needed as even when all the transponders belonging to the present invention are operating in time division, anyway other asynchronous signals from other transponders (conventional squitter, replies) polluting the electromagnetic environment around 1090 MHz are unavoidably present.

The invention includes signal generation and transmission means from each transponder with selection of the carrier frequency (called frequency agility) and with selection of the transmission time for each mobile (called time agility or time division multiple access), signal discrimination means in the receiving station, uplink transmission means to the transponder and timing recovery means in the transponder for the time division operation, as well as means for managing the frequency diversity and the time diversity in the whole system.

FIG. 1 shows a general diagram of the high-capacity location and identification system for cooperating mobiles with frequency agile and time division transponder device, according the preferred embodiment of the present invention.

The embodiment of the present invention, with reference to the techniques and the principles as described before, is therefore a system composed by:

A frequency and time agile transponder device, made up by the following elements:
1. Carrier frequency digital selector.
2. Frequency generator.
3. Transmitting chain, including vehicle data memory, signal and code generator and the antenna.

Figure 2:
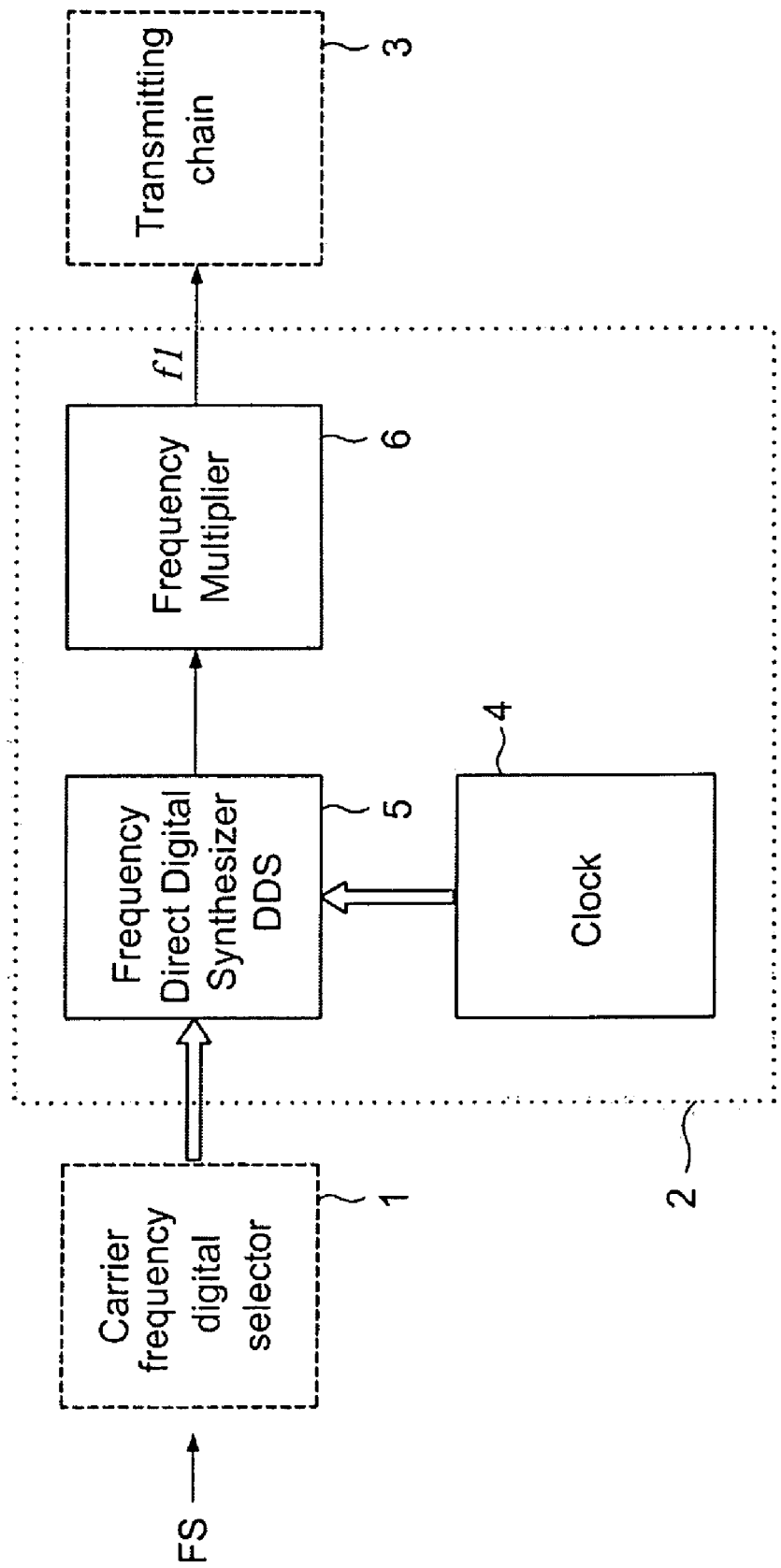
FIG. 2: Block diagram of the carrier frequency generator of the frequency agile and time division transponder, part of the present invention.

TU: Transmission time selection (Timing Unit)
GA: GPS/Egnos/Galileo antenna
GR: GPS/Egnos/Galileo Receiver
Rx: Receiver at 1090 MHz, including the antenna
HMI: Human Machine Interface;
   A fixed infrastructure, made up by the following elements (connected by a standard telecommunication system such as a local area network on fibre optics):
RS: Receiving fixed station
TS: Transmitting fixed station CPMS: Central Processing and Management Subsystem.
The fixed and the mobile part of the system communicate thru the radio channel:
Ch: Propagation channel (at 1090 MHz)
where the following signals are transferred:
S: Signal at the output to the transponder
S': Signal at the input to the receiving station, affected by delay and attenuation
$S_T$: Signal from transmitting station
$S_{IN}$: Signal at the transponder input, from transmitting station and from other transponders The preferred implementation for the block number 2 (Frequency generator) is shown in the FIG. 2:
This frequency generator is composed by the following elements:
4. Clock obtained by a local stable oscillator (for example an Oven Controlled Crystal Oscillator-OCXO).
5. Frequency Direct Digital Synthesizer DDS.
6. Frequency multiplier.

Furthermore, with $f_1$ we have indicated the intermediate frequency of the transmitted signal.

The clock (block 4) works at a fixed frequency and permits the generation of the intermediate frequency $f_1$. A sinusoidal signal of variable frequency is generated by a Direct Digital Synthesizer (DDS) (block 5). This device is able to synthesize any waveform but in the specific case of this invention it is used to obtain a sinusoidal signal with an appropriate frequency. The DDS technique is described in the paper:

[8] L. Cordesses: " *Direct Digital Synthesis: a tool for periodic wave generation* (Part 1)", *IEEE Signal Processing Magazine,* July 2004, pp. 50-54.

The numerical output of the block 1 defines the mean frequency value generated by the block 5; for example, 7.5 MHz is a possible central value of the set of the generated frequencies. DDS is followed (according to the techniques well known to the experts) by a frequency multiplier to produce an intermediate nominal frequency signal, that has a preferred value around 30 MHz (in practice other values are possible and equally effective, for example 60 MHz).

Figure 3:
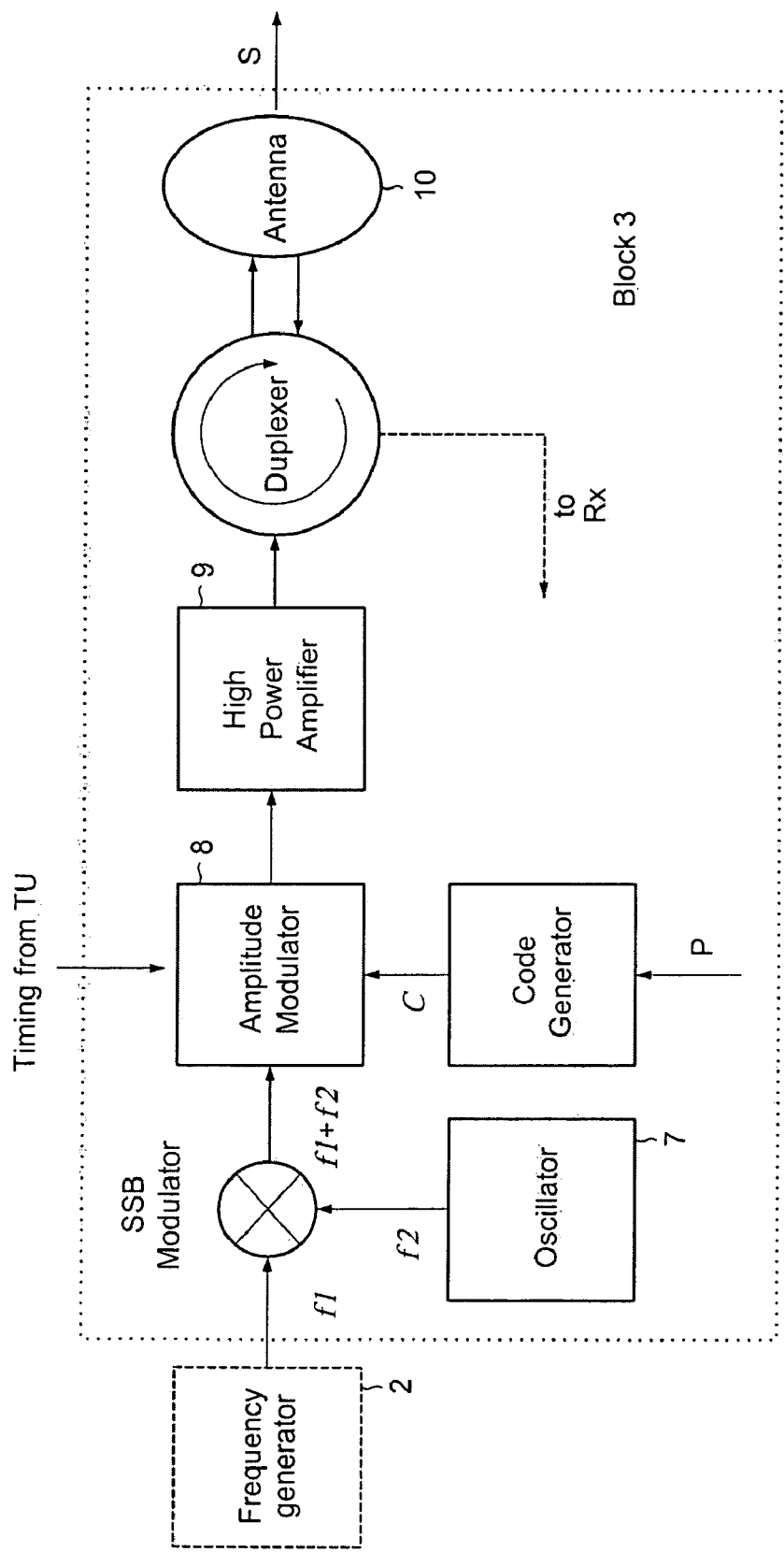
FIG. 3: Block diagram of the transmitting chain of the frequency agile and time division transponder, part of the present invention.

A possible implementation, preferred in the frame of the present invention, of the transmitting chain (block 3 in FIG. 1) is shown in FIG. 3 which represents a transmitting chain block diagram, part of the present invention.

This chain is composed by the following elements:
7. Oscillator (achieved for example by a PLL—Phase Locked Loop) that generates a fixed radio frequency.
Single-sideband modulator for frequency conversion
8. Amplitude modulator for the generation of the waveform (preamble, code) of SSR signals.
9. High Power Amplifier (HPA).
10. Antenna of the transponder device
CG. Code Generator and trigger
D. Duplexer between antenna and HPA (needed to use the antenna in reception and transmission; a solution with two antennas, for transmission (downlink) and reception (uplink, crosslink), is possible and, at the expense of one more antenna, eliminates the Duplexer.
Furthermore, we have indicated:

with C, the signal code (SSR reply or squitter with the pertaining time of emission, from TU, and the position P of the transponder, from GR);

with $f_1$, the frequency generated by the block 2;

with $f_2$, the frequency generated by the fixed oscillator.

Other implementations of the transmitting chain are possible such as the one based on a programmable frequency divider and an automatic frequency control loop, well known to the experts in the receivers/transmitters area.

Figure 4:
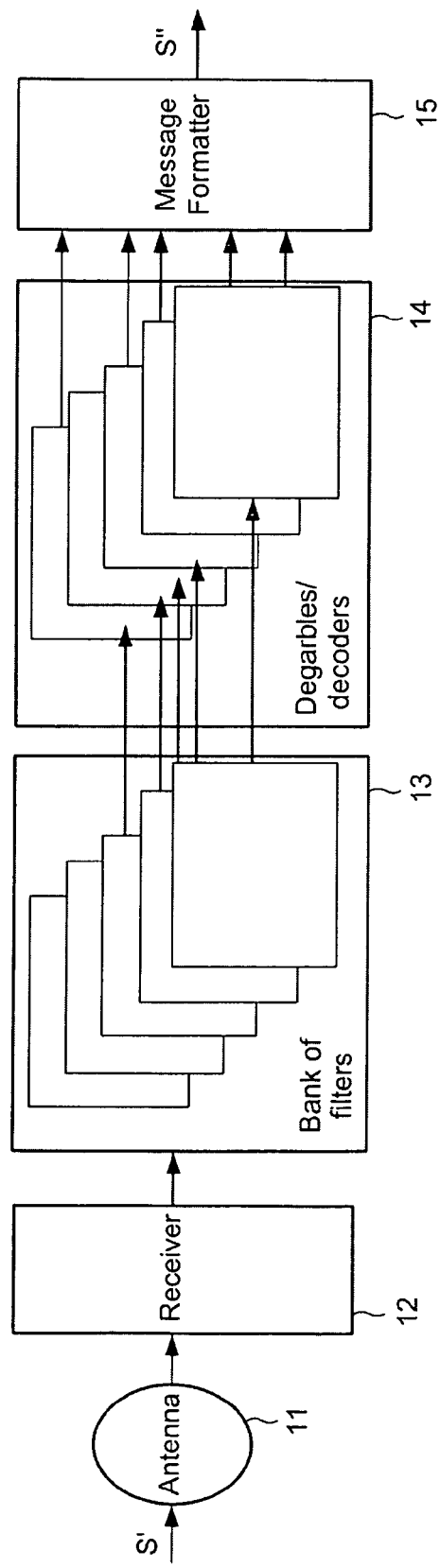
FIG. 4: Block diagram of the receiving fixed station, part of the present invention.

A possible implementation, preferred in the frame of the present invention, of the receiving station, part of the fixed infrastructure (see the general block diagram shown in FIG. 1) is shown in FIG. 4.

This chain is composed by the following elements:

11. Antenna (in a precise, fixed location)
12. Receiver.
13. Bank of filters (one for each channel; five channels shown for explanation purposes)
14. Degarblers/decoders and time-of-arrival estimators
15. Message formatter (from each channel) and transmitter to the CPMS Furthermore, we have indicated:

with S' the Signal from Transponder devices
with S" the Signal to the CPMS.

The operation of the present invention is now described in non limitative way with reference made to its presently preferred implementation form and to the annexed drawings (FIGS. 1 to 4).

Block 1 determines the channel (e.g. one of five) and within the channel the carrier frequency value of the transmitted signal S: this value is defined by the operator thru the HMI, or received from the CPMS (the Central Processing and Management Station that has the task of manage the system in which the transponder operates). This value, coded in digital form, is sent to the block 2 that, under commonly used and well known techniques among which the direct digital synthesis is preferred, generates the intermediate frequency (that differs from the carrier frequency for a fixed and know quantity and is obtained by a stable clock—block 4—and a digital synthesizer—block 5—followed by a frequency multiplier—block 6).

The intermediate frequency oscillation is sent to the block 3. In this block, by a simple frequency conversion (achievable, as well know to the experts in transmitters and receivers, with a single side band modulator—SSB Modulator—and a stable oscillator on a proper fixed frequency—block 7) is generated the transmitted frequency that, as explained before, is included in an channel within the ICAO downlink band, i.e. around 1090 MHz. The oscillation at this frequency, amplitude modulated (block 8) according to the standard SSR signal format (that is essentially a sequence of rectangular impulses), or, for the NTD used by the ground vehicles, by a dedicated modulation such as the BOC, is sent to a power amplifier (block 9) and from this block (thru the Duplexer device D used when a single antenna transmits and receives) to the antenna (block 10) for the transmission of the signal, indicated with S.

The implementation form for the transmitting chain can be changed with respect to what we have described; for example, amongst the alternative implementations of the present invention there are the following:

a. To send Code C directly to the DDS, therefore on the intermediate frequency and not on the radio frequency of the signal S;

b. To use a frequency synthesizer like a programmable PLL (phase-locked loop) in the place of the DDS.

Block TU (FIG. 1) is the Timing Unit which determines the precise transmission time of the signal from the transponder. The inputs to block TU are:

(a) TG: GPS/Galileo Time from the block GR (b) Timing errors from the CPMS, transmitted from a nearby transmitting station TS and contained in the signal ST.

The TU computes the transmission time after correction, by filtering and prediction, of the timing errors due to the transponder clock deviations, according to well known methods.

Block CG determines the information content of the transmitted signal and the transmission instant, according to the TU output.

Block Rx is the receiver for uplink and crosslink signals; thru Rx the CPMS determines the agile operation of the transponder in terms of frequency channel, frequency value within the channel (FS: Frequency selection command) and time slots for transmission and for reception of uplink and crosslink signals.

Block HMI is the interface with the operator and the driver of the vehicle, including a display with a keyboard and/or a pointing device; some commands from the CPMS may be implemented by the HMI with possible override when necessary.

Block GR is a standard GPS (and EGNOS and, in the future, Galileo) receiver, and GA his antenna. The receiver determines the GPS time, $T_G$, and the position P of the transponder (i.e. of the mobile); the former is used by the TU for the determination of transmission timing, the latter is sent to the RS by means of the signal S thru the antenna (block 10). After the radio channel, the signal is received by the antenna of the RS, block 11; from the antenna it is sent to an analogue receiver for the standard prefiltering, amplification and down-conversion functions, block 12; then it is filtered to be sent to one of the channels, block 13, and to one of the degarblers and decoders, block 14, where the detection is performed, the TOA is measured and the information content of the signal is obtained. The pertaining message is formatted in block 15 and sent to the CPMS, as a signal S", via the fixed communication infrastructure.

In order to get maximum flexibility in the usage of the transponder—fixed station communication channel, the fixed transmitting stations are able to interrogate a transponder device eliciting replies either immediately or in the next time slot assigned to the transponder device, the selection being made by the interrogation format.

In turn, the CPMS takes care of the tracking of all vehicles and of the managing of the whole system, including the definition of time slots and frequency values for each transponder; the CPMS communicates with the network of TS by means of the fixed communication infrastructure and, via a TS, with the transponder.

In particular, the system has an internal time reference locked to the clock of one Transmit Station (that can be implemented as a transmit and receiving station, see below). In a fixed, precisely localized (geodetic) point, preferably in a SGU location, the system has a Navigation Satellite Satellite System (GNSS: GPS/Galileo) receiver with integrity analysis capacity: when the GNSS-derived time is going out of tolerance due to GNSS failures or interference, an integrity alarm is sent to the CPMS which computes and, via the TS and the uplink channel, sends periodical timing corrections to all transponders to maintain a correct TDMA. When the GNSS is operating within the standards but one or more transponders, for propagation or other reasons, do not derive a correct GNSS time, the CPMS, analysing the Time of Arrival from them, detects the time shift with respect to the time slot allocated to them and computes and sends (via the TS) the timing corrections to the interested transponder(s).

The implementation form for the receiving fixed station can be changed with respect to what we have described; for example, a fixed station can both transmit and receive, thus avoiding the discrimination between RS and TS.

However these, or other variations, remain within the frame of the present invention, such as it is defined by the following claims.

The invention claimed is:

1. A high-capacity surveillance and data link system able to locate and identify cooperating mobiles provided with a respective transponder device and a fixed infrastructure comprising fixed transmitting and receiving stations, the system being arranged to locate and identify the cooperating mobiles using Multilateration and/or Automatic Dependent Surveillance-Broadcast (ADS-B) techniques by means of transmission of position, identification, status information and ancillary data from the mobiles to the fixed receiving stations on the Secondary Surveillance Radar (SSR) Mode S channel, the system being further arranged to transmit commands, controls, nearby traffic information and ancillary data from the fixed transmitting stations to the cooperating mobiles on the Secondary Surveillance Radar (SSR) Mode S channel, the system being characterized in that each transponder is provided with a variable carrier frequency and the system is arranged to implement frequency-division multiple access in the down-link Secondary Surveillance Radar (SSR) Mode S channel using the variable carrier frequencies.

2. The high-capacity location and identification system for cooperating mobiles, as in claim 1, characterized by a time division multiple access for transmission from and to the mobiles, according to time slots assigned to each mobile and managed by a central processing and managing subsystem (CPMS).

3. A transponder device, which is part of the location and identification system as defined in claim 1, characterized in that for every signal transmitted by this device, the carrier frequency can be changed according to an input from a central processing and managing subsystem or from a human machine interface of the device itself.

4. The device, as in claim 3, characterized in that values of a central frequency variation with respect to a standard value are grouped in a number of different channels corresponding one-to-one to receiving channels in the system'receiving stations.

5. The device , as in claim 3, characterized in that a central frequency variations, belonging to a set of predefined values, is stored in a digital selector that drives a frequency generation system which, in turn, generates the carrier frequency for signals transmitted by the said device.

6. The device, as in claim 5, characterized in that the frequency generation system synthesizes an intermediate frequency from which the carrier frequency is obtained.

7. The device, as in claim 6, characterized in that the intermediate frequency is obtained by direct digital synthesis.

8. The device Devise, as in claim 6, characterized in that the carrier frequency is obtained from the intermediate frequency by multiplication and frequency conversion.

9. The device, as in claim 3, characterized in that the carrier frequency represents a central frequency of the spectrum of the signal that, after amplitude modulation, is amplified and emitted from an antenna.

10. The device , as in claim 3, further comprising a Global Navigation Satellite System receiver whose position data are used to locate the mobile in the ADS-B operation and whose time datum is used, as an input to a timing unit, to control emission time in a time division multiple access operation.

11. The device , as in claim 3, characterized in that emission time is regulated by a timing unit having at its input, from the central processing and managing subsystem (CPMS), a time information and a Global Navigation Satellite System (GNSS) integrity monitoring signal, permitting correct time division multiple access even in the case of unavailability of the Global Navigation Satellite System.

12. The device, as in claim 3, characterized in that it receives, from one or both of nearby devices and the central processing and managing subsystem, signals containing the position of nearby mobiles, and displays traffic information to an operator by a human-machine interface.

13. The high-capacity location and identification system for cooperating mobiles, as in claim 1, characterized by the fixed infrastructure implementing a coordinated and simultaneous use of frequency division multiple access and of time division multiple access for transmission from and to the mobiles, having on board a device characterized in that for every signal transmitted by this device, the carrier frequency can be changed according to an input from a central processing and managing subsystem or from a human machine interface of the device itself.

14. The high-capacity location and identification system for cooperating mobiles, as in claim 1, characterized by the fixed transmitting stations being configured to interrogate transponder device eliciting replies either immediately or in the next time slot assigned to the transponder device itself.

15. The high-capacity location and identification system for cooperating mobiles, as in claim 1, characterized by analysis of time of arrival of signals from the mobiles and from reference signal generators , a detection of time errors with respect of scheduled time values and transmission of error data to each mobile, permitting correction of the timing by a filter/estimator.

16. The high-capacity location and identification system for cooperating mobiles, as in claim 1, characterized by controlling and managing traffic on runways, taxiways and pertaining connections.

17. The high-capacity location and identification system for cooperating mobiles, as in claim 1, characterized by controlling and managing movements and operations on an apron of an airport.

18. The high-capacity location and identification system for cooperating mobiles, as in claim 1, characterized by controlling and managing aircraft nearby an airport, in the Terminal Manoeuvring Area and in a surrounding airways complex.

19. The high-capacity location and identification system for cooperating mobiles, as in claim 1, characterized by managing marine traffic in a vessel traffic system context.

20. A Mode-S transponder system comprising:

transponders each configured for attachment to a respective mobile and each including a carrier frequency selector for variably selecting a carrier frequency within one of a plurality of channels around 1090MHz; and an infrastructure comprising a fixed transmitter and a fixed receiver, the transponders being further configured to implement frequency division multiple access in a downlink Secondary Surveillance Radar (SSR)-Mode S channel wherein a first one of the transponders is configured to transmit signals comprising one or more of position, identification, status information and ancillary data to the fixed receiver at a first carrier frequency selected via the corresponding carrier frequency selector and a second one of the transponders is configured to transmit signals comprising one or more of position, identification, status information and ancillary data to the fixed receiver at a different, second carrier frequency selected via the corresponding carrier frequency selector.

21. The Mode-S transponder system according to claim 20, wherein the first and second transponders are further configured to transmit their respective signals in a time division multiple access operation.

22. The Mode-S transponder system according to claim 20, wherein the infrastructure comprises at least four fixed receivers and the system is configured to use multilateration to determine transponder position.

23. The Mode-S transponder system according to claim 20, wherein the fixed receiver comprises filters provided in correspondence with the plurality of channels.

24. The Mode-S transponder system according to claim 20, wherein the carrier frequency selector selects a carrier frequency in response to a command transmitted by the fixed transmitter.

25. The Mode-S transponder system according to claim 20, wherein the carrier frequency selector selects a carrier frequency in response to an input to a human-machine interface.

* * * * *